United States Patent [19]

Mitsuyama et al.

[11] Patent Number: 4,796,063

[45] Date of Patent: Jan. 3, 1989

[54] MULTIPLE-UNIT TYPE COPYING APPARATUS

[75] Inventors: Akira Mitsuyama; Toshio Yamagishi; Masanobu Deguchi, all of Nara, Japan

[73] Assignee: Sharp Kabushiki Kaisha, Osaka, Japan

[21] Appl. No.: 121,801

[22] Filed: Nov. 17, 1987

[30] Foreign Application Priority Data

Nov. 17, 1986 [JP] Japan .............................. 61-273717
Nov. 17, 1986 [JP] Japan .............................. 61-273718

[51] Int. Cl.[4] ........................................ G03B 27/52
[52] U.S. Cl. ........................................ 355/133
[58] Field of Search .................. 355/14 R,69, 75, 133, 355/12 D; 439/489, 49 D

[56] References Cited

U.S. PATENT DOCUMENTS 3,698,804 10/1972 Cranskens ........................ 355/11 X
4,480,195 10/1984 Sawaki et al. .................... 355/69 X

FOREIGN PATENT DOCUMENTS 3047706 of 0000 Fed. Rep. of Germany .
63-110464 5/1988 Japan .

OTHER PUBLICATIONS

IBM Technical Disclosure Bulletin–Copier's Pluggable Meter System by Eichhorn et al., vol. 22, No. 7, Dec. 1979.
IBM Technical Disclosure Bulletin, vol. 25, No. 1.
Patent Abstracts of Japan, vol. 10, No. 22.
Patent Abstracts of Japan, vol. 7, No. 262.
Patent Abstracts of Japan, vol. 7, No. 54.
Patent Abstracts of Japan, vol. 7, No. 241.

*Primary Examiner*—L. T. Hix
*Assistant Examiner*—D. Rutledge
*Attorney, Agent, or Firm*—Birch, Stewart, Kolasch & Birch

[57] ABSTRACT

A multiple-unit type copying apparatus having an apparatus housing divided into a plurality of units including an optical system unit in which an optical system and a driving device are incorporated and which is openably provided so as to be opened about its one end portion relative to the remaining units. The copying apparatus further includes a connector for coupling the driving device with a power source circuit, a coupling detecting device for detecting a coupling state of the connector and a power supply cut-off device for cutting off power supply to the remaining units when it has been found by the coupling detecting device that the connector is in an uncoupled state.

6 Claims, 7 Drawing Sheets

MULTIPLE-UNIT TYPE COPYING APPARATUS

BACKGROUND OF THE INVENTION

The present invention generally relates to electrophotographic copying apparatuses and more particularly, to a multiple-unit type copying apparatus having an apparatus housing divided into a plurality of units.

Conventionally, in electrophotographic copying apparatuses, it has been so arranged that an image of an original document is scanned by an optical system. At this time, light of a light source of the optical system is irradiated onto and reflected from the original document. The reflected light is led to a copying process portion in which an electrostatic latent image is formed on a surface of a photoreceptor. Then, developer is supplied to the electrostatic latent image so as to form a developer image such that the developer image is transferred onto a copy paper sheet which has been conveyed to the copying process portion from a paper feeding portion. The copy paper sheet is conveyed through a paper transport passage extending from the paper feeding portion, through the copying process portion, to a paper discharging portion. As described above, a number of devices are provided in the apparatus housing.

In the known copying apparatuses, in order to facilitate assembly and maintenance of these devices, the apparatus housing is divided into a plurality of units which are assembled with each other openably or detachably. After components have been mounted on each of the units, the units are assembled with each other, whereby replacement and maintenance of the components can be performed easily.

However, in the above described known multiple-unit type copying apparatuses, in order to drive a driving device mounted on each of the units, it is necessary to input control data to a control portion of the driving device by tapping keys of an operating portion attached to an uppermost one of the units. Therefore, in order to check a driving state of the driving devices mounted on the lower units having no driving portion, the uppermost unit should be beforehand assembled with the lower units and thus, it becomes difficult to check the driving state of the driving devices of the lower units. As a result, the known multiple-unit type copying apparatuses have such drawbacks that it is difficult to locate defective portions and it is troublesome to mount the components on each of the units.

Meanwhile, in a prior art copying apparatus, the apparatus housing is divided, at the paper transport passage, into upper and lower units. When the apparatus housing is divided into the two units as described above, mounting of the components can be performed easily. Furthermore, since the paper transport passage can be divided vertically, it becomes possible to easily remove jammed copy paper sheets from the paper transport passage. When the apparatus housing is divided, at the paper transport passage, into the two units, the paper transport passage is provided in the lower unit, while the copying process portion and the optical system are provided in the upper unit. Since each of the optical system and the copying process portion is constituted by a number of components, assembly of the upper unit is not easy. Especially, when components of the optical system are mounted on the upper unit, wires for transmitting a driving force to the light source are laid. However, since there is no ample space for laying the wires, it is troublesome to mount the components of the optical system on the upper unit.

Therefore, in Japanese Patent Application No. 257685/1986 filed on Oct. 29, 1986, the assignee assigned by the present inventors proposed a multiple-unit type copying apparatus having an apparatus housing divided into three units, in which the optical system, the copying process portion and the paper transport passage are, respectively, provided in the upper, central and lower units, respectively. In this multiple-unit type copying apparatus of the above described arrangement, since the optical system, the copying process portion and the paper transport passage can be mounted on the respective three units, productivity of the multiple-unit type copying apparatus can be raised. Especially, in assembly of the optical system, since ample space for laying the wires can be secured, the optical system can be mounted on the upper unit easily. Meanwhile, operations such as removal of jammed copy paper sheets can be performed easily by providing the units openably.

However, in this multiple-unit type copying apparatus having the apparatus housing divided into the three units, when the upper unit provided with the optical system has been opened, devices constituting the copying process portion are exposed externally. The devices constituting the copying process portion includes a rotatable photosensitive (photoreceptor) drum and a corona charger to which a high voltage is applied. Therefore, when the upper unit has been opened, an operator has access to these devices of the copying process portion. Meanwhile, at the time of adjustment of the copying apparatus after its assembly or at the time of maintenance of the copying apparatus, the serviceman or operator frequently touches these devices of the copying process portion with hands. Therefore, if adjustment or maintenance of the copying apparatus is performed in a state where electric power is supplied to the devices of the copying process portion, the serviceman or operator may be injured or the devices of the copying process portion may be damaged upon unexpected drive of the devices of the copying process portion due to erroneous operations or malfunctions of the devices of the copying process portion, thereby endangering safety of adjustment or maintenance of the copying apparatus.

SUMMARY OF THE INVENTION

Accordingly, an essential object of the present invention is to provide a multiple-unit type copying apparatus having an apparatus housing divided into three units, in which when an upper unit provided with an optical system has been opened, power supply to at least externally exposed ones of devices of a copying process portion is cut off such that safety of adjustment or maintenance of the copying apparatus is ensured.

Another important object of the present invention is to provide a multiple-unit type copying apparatus of the above described type in which in a state where units having no control portion are provided separately from each other, control data can be inputted to control portions of driving devices mounted on the units having no control portion so as to drive the driving devices of the units having no control portion such that not only defective portions can be located easily but assembly and maintenance of the copying apparatus are simplified.

In order to accomplish these objects of the present invention, a multiple-unit type copying apparatus according to one preferred embodiment of the present invention has an apparatus housing divided into a plurality of units, the improvement comprising: said units including a first unit in which an optical system and a driving means for driving said optical system are incorporated; said first unit being openably provided so as to be opened about its one end portion relative to the remaining units; a connector for coupling said driving means with a power source circuit, which is provided at a portion of said first unit other than said one end portion; a coupling detecting means for detecting a coupling state of said connector; and a power supply cut-off means for cutting off power supply to the remaining units when it has been found by said coupling detecting means that said connector is in an uncoupled state.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
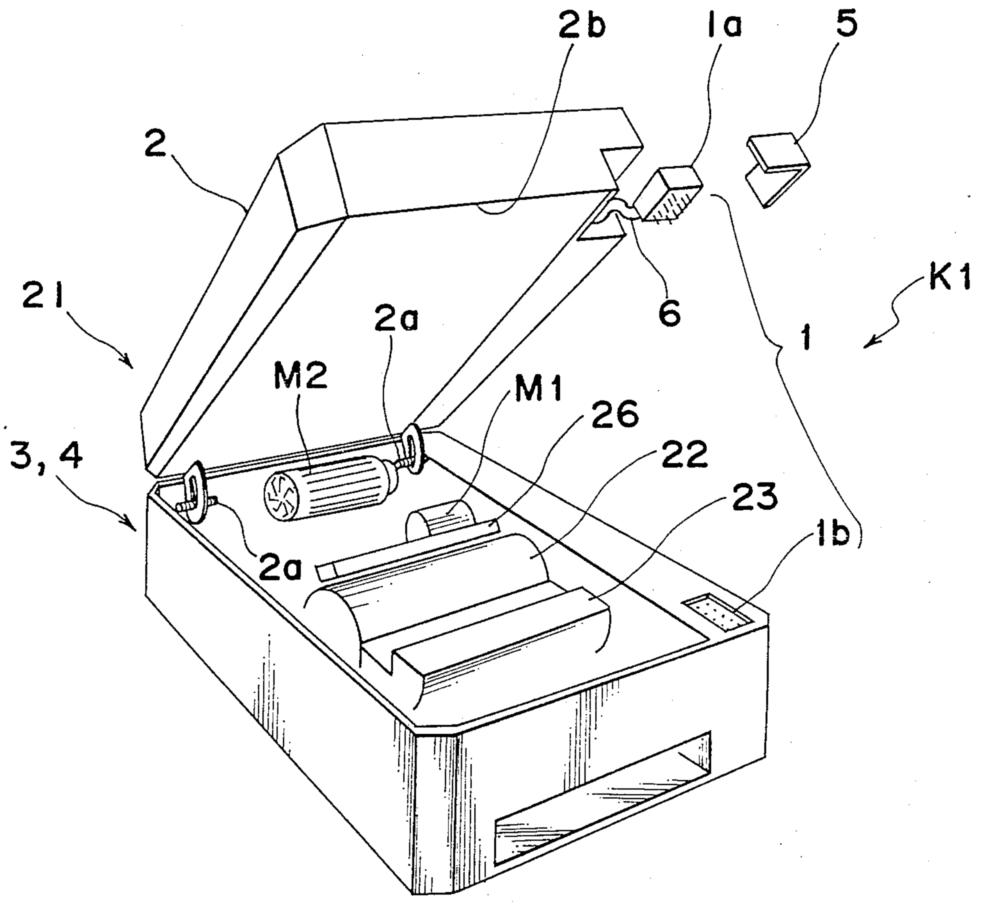
FIG. 1 is a schematic perspective view of a multiple-unit type copying apparatus according to a first embodiment of the present invention.
Figure 2:
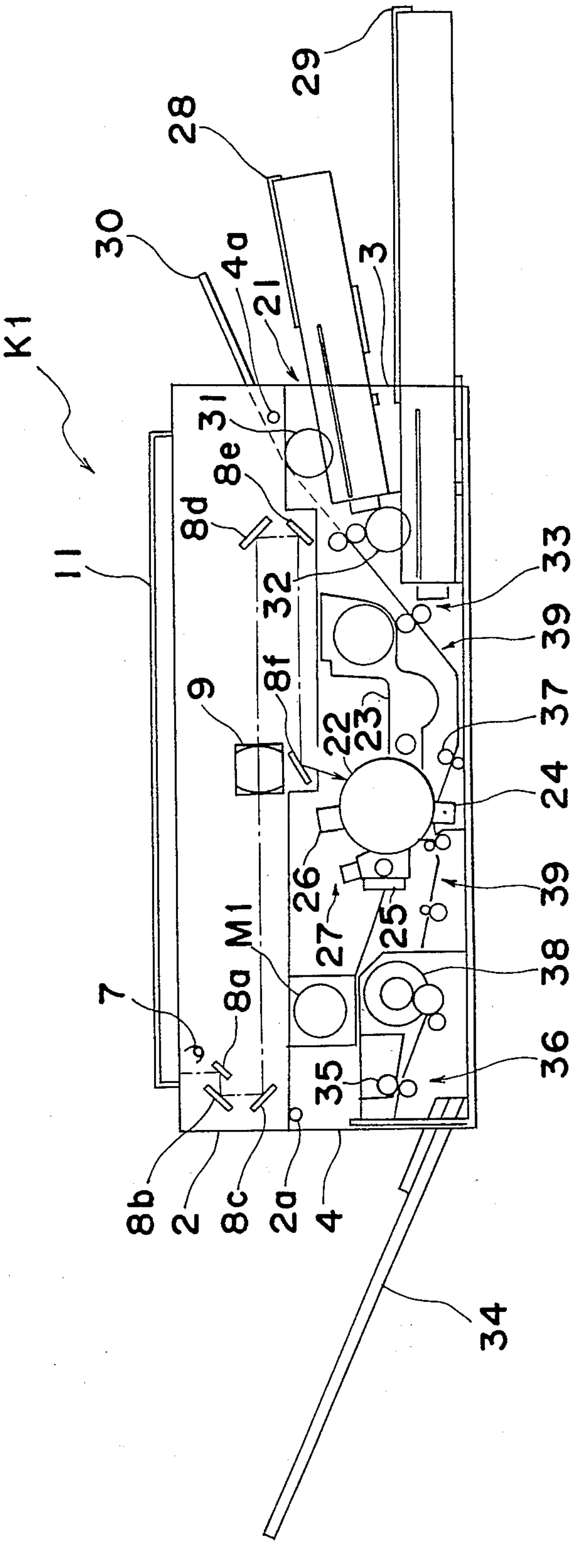
FIG. 2 is a schematic sectional view of the copying apparatus of FIG. 1.

Referring now to the drawings, there is shown in FIGS. 1 and 2, a multiple-unit type copying apparatus K1 according to a first embodiment of the present invention. As shown in FIG. 2, the copying apparatus K1 includes an apparatus housing 21 divided into an upper unit 2, a central unit 4 and a lower unit 3. A photosensitive (photoreceptor) drum 22 is rotatably provided at a central portion of the apparatus housing 21 and constitutes a copying process portion 27 together with a developing device 23, a transfer charger 24, a cleaner 25, a corona charger 26, etc. which are disposed around the photosensitive drum 22. In the copying process portion 27, the photosensitive drum 22, the developing device 23, the cleaner 25 and the corona charger 26 are provided in the central unit 4, while the transfer charger 24 is provided in the lower unit 3 so as to confront the photosensitive drum 22. Furthermore, a main motor M1 and a fan motor M2 are provided in the central unit 4. Paper cassettes 28 and 29 and a manual paper feeding tray 30 are loaded into one side of the lower unit 3 so as to constitute a paper feeding portion 33 together with paper feeding rollers 31 and 32. A copy receiving tray 34 is loaded into the other side of the lower unit 3 so as to constitute a paper discharging portion 36 together with paper discharging rollers 35.

A paper transport passage 39 is defined so as to extend from the paper feeding portion 33, through the copying process portion 27, to the paper discharging portion 36. Timing rollers 37, fixing rollers 38, etc. are provided in the course of the paper transport passage 39. The central unit 4 and the lower unit 3 are separated from each other at the paper transport passage 39. The devices of the copying process portion 27, the main motor M1 and the fan motor M2 are provided in the central unit 4. The central unit 4 is openably mounted on the lower unit 3 so as to be opened about a pair of shafts 4*a* relative to the lower unit 3.

An optical system constituted by a light source 7, mirrors 8*a* to 8*f* and a lens 9 is provided in the upper unit 2. Meanwhile, an original platform 11 is provided on an upper face of the upper unit 2. The upper unit 2 is openably mounted on the central unit 4 so as to be opened about a pair of shafts 2*a* relative to the central unit 4. At the time of a copying operation of the copying apparatus K1, the light source 7 and the mirrors 8*a* to 8*c* are horizontally displaced below the original platform 11 so as to scan an image of an original document placed on the original platform 11. At this time, light of the light source 7 is irradiated onto the image of the original document and its reflected light is led, by way of the mirrors 8*a* to 8*f* and the lens 9, to a surface of the photosensitive drum 22 as shown in the one-dot chain lines in FIG. 2.

At the time of assembly of the apparatus housing 21, the optical system, the copying process portion 27 and the paper transport passage 39 are, respectively, provided in the upper unit 2, the central unit 4 and the lower unit 3 and then, the upper unit 2, the central unit 4 and the lower unit 3 are assembled with each other. Even after the units 2 to 4 have been assembled with each other, it is possible to remove the shafts 2*a* and 4*a* such that the units 2 to 4 can be separated from each other at the time of maintenance of the copying apparatus K1.

As shown in FIG. 1, when the upper unit 2 has been opened about the shafts 2*a* relative to the upper unit 4, the photosensitive drum 22, the developing device 23, the corona charger 26, the main motor M1 and the fan motor M2 are exposed externally. At this time, a plug 1*a* of a connector 1 for electrically connecting the central unit 4 and the upper unit 2, which is provided at the upper unit 2, is uncoupled from a jack 1*b* embedded in a upper face of the central unit 4. At one corner of an open end 2*b* of the upper unit 2, the plug 1*a* is provided at a distal end of an electric lead 6. Although not specifically shown in FIG. 1, the electric lead 6 is connected to an optical system motor M3 for driving the optical system and a lens motor M4 for displacing the lens 9. A cover 5 is provided at the corner of the open end 2*b* of the upper unit 2 so as to cover the plug 1*a*. By removing the cover 5 from the upper unit 2, the plug 1*a* of the connector 1 is exposed. A length of the electric lead 6 is so set as to be far smaller than a distance of travel of the open end 2*b* of the upper unit 2. When the upper unit 2 is closed relative to the central unit 4, the plug 1*a* is coupled with the jack 1*b*.

Figure 3:
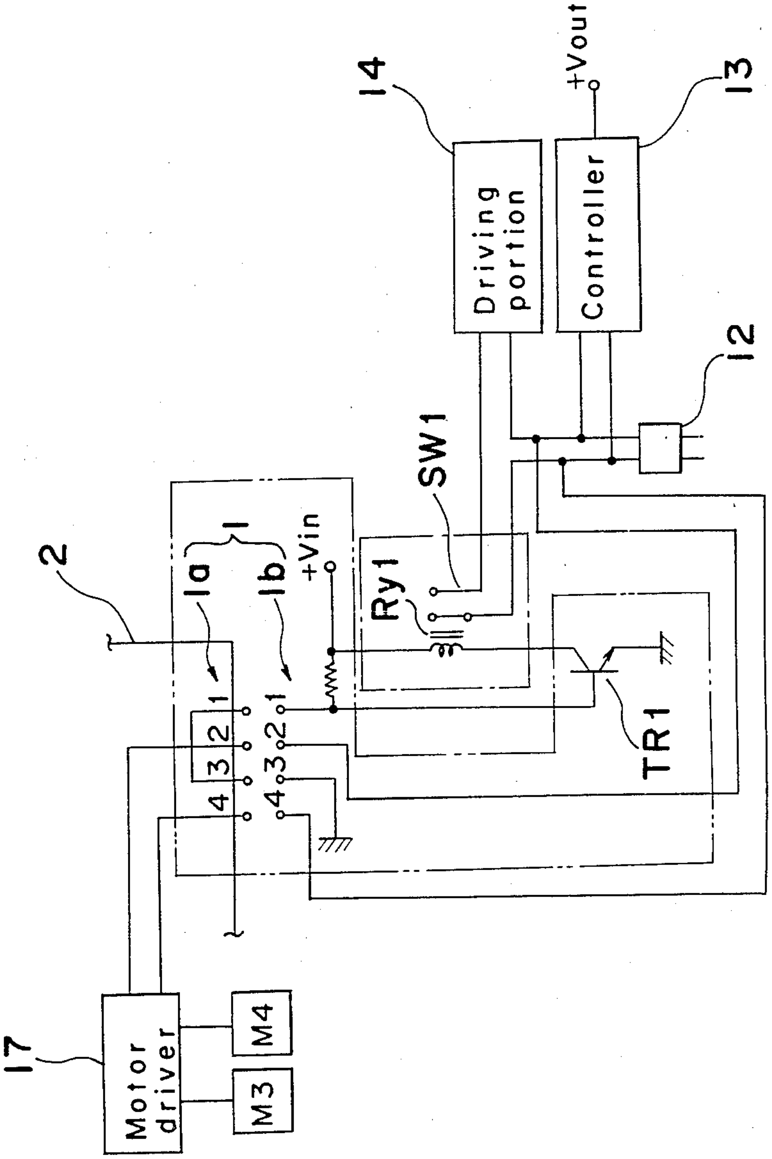
FIG. 3 is a circuit diagram of the copying apparatus of FIG. 1.

FIG. 3 shows an electric circuit of the copying apparatus K1. Two electric leads of a plug 12 to be connected to an AC power source are connected to a controller 13 and second and fourth pins of the jack 1b and are also connected, through a switch SW1, to a driving portion 14 including the main motor M1. On the other hand, in the upper unit 2, second and fourth pins of the plug 1a of the connector 1 are connected to a motor driver 17 for supplying electric power to the optical system motor M3 and the lens motor M4.

In the case where the plug 1a and the jack 1b of the connector 1 are not coupled with each other, a voltage of +V from the controller 13 is not grounded, so that the base of a transistor TR1 has an electric potential of +V and thus, the voltage of +V is applied to a relay Ry1. At this time, the switch SW1 is turned off and thus, electric power from the AC power source is not supplied to the driving portion 14.

On the other hand, when the plug 1a and the jack 1b have been coupled with each other, the voltage of +V from the controller 13 is grounded and thus, the base of the transistor TR1 has a ground potential. Hence, the voltage of +V is not applied to the relay Ry1 and thus, the switch SW1 is turned on. Therefore, electric power from the AC power source is supplied to the driving portion 14. In the above described electric circuit of the copying apparatus K1, the relay Ry1 and the switch SW1, which are enclosed by the one-dot chain lines in FIG. 3, function as the power supply cut-off means of the present invention, while the transistor TR1, which is enclosed by the two-dot chain lines in FIG. 3, functions as the coupling detecting means of the present invention.

As will be seen from the foregoing description, in this embodiment of the present invention, a coupling state of the connector 1 is detected by the transistor TR1 and the voltage of +V is selectively applied to the relay Ry1 according to the coupling state of the connector 1 such that the switch SW1 is turned on and off. This switch SW1 is provided between the AC power source and the driving portion 14 such that power supply to the main motor M1, the transfer charger 24, the corona charger 26, etc. provided in the central unit 4 and the lower unit 3 is selectively performed effectively upon turning on and off of the switch SW1.

In accordance with the first embodiment of the present invention, a coupling state of the connector for coupling the power source and the driving means provided in the upper unit is detected by the coupling detecting means such that power supply to the central and lower units can be selectively cut off by the power supply cut-off means according to the coupling state of the connector. Since the connector is provided at the open end of the upper unit remote from the end adjacent to the hinge shafts, the plug and the jack of the connector are uncoupled from each other when the upper unit has been opened relative to the central unit. Accordingly, when the upper unit has been opened relative to the central unit, power supply to the central and lower units is cut off and thus, it becomes possible to safely perform adjustments or maintenance of the copying apparatus.

Figure 4:
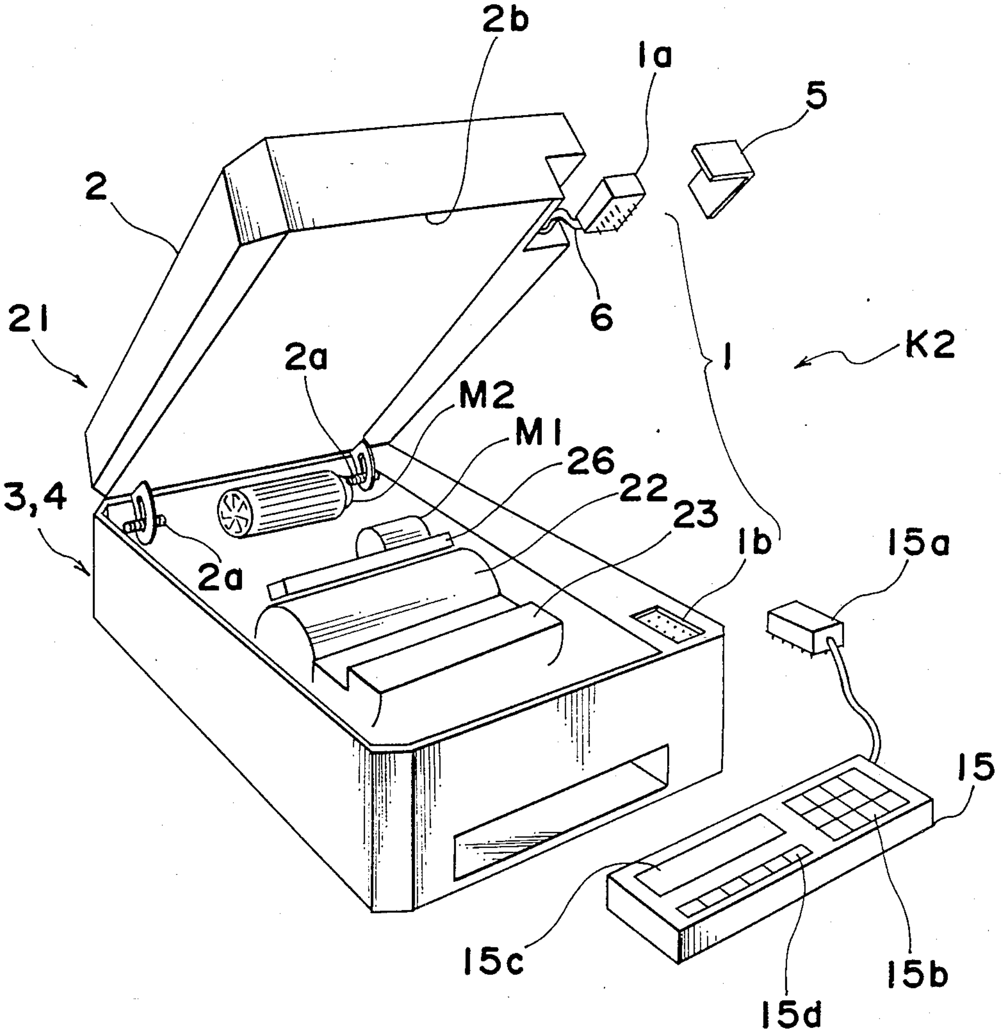
FIG. 4 is a view similar to FIG. 1, particularly showing a second embodiment of the present invention.

Referring further to FIG. 4, there is shown a multiple-unit type copying apparatus K2 according to a second embodiment of the present invention. When the upper unit 2 has been opened relative to the central unit 4, the plug 1a is uncoupled from the jack 1b as described earlier. Thus, an operating portion provided on an upper face of the upper unit 2 is disconnected from a control portion provided in the central unit 4. Therefore, a driving device constituted by the main motor M1 and the fan motor M2 cannot be actuated by tapping keys of the operating portion of the upper unit.

In contrast with the copying apparatus K1, the copying apparatus K2 includes an input device 15 provided separately from the apparatus housing 21. The input device 15 is provided with a plug 15a which can be coupled with the jack 1b of the connector 1. The input device 15 further includes ten keys 15b, an indicator 15c and setting keys 15d.

Figures 5A, 5B:
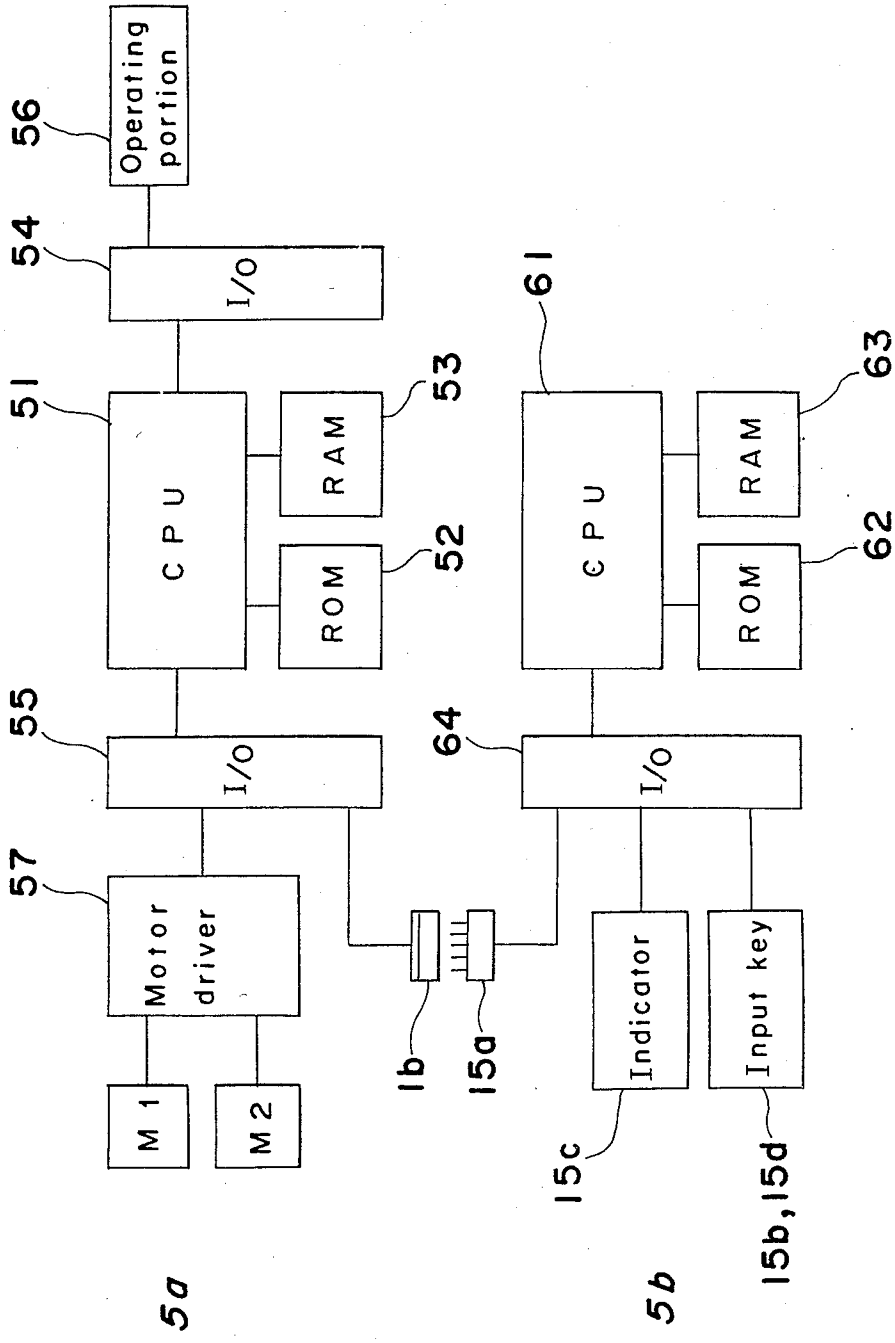
FIGS. 5*a* and 5*b* are, respectively, electrical block diagrams of control portions of an apparatus housing and an input device employed in the copying apparatus of FIG. 4.

FIGS. 5a and 5b show control portions of the apparatus housing 21 and the input device 15 of the copying apparatus K2, respectively. The control portion of the apparatus housing 21 includes a central processing unit (CPU) 51, a read-only memory (ROM) 52, a random access memory (RAM) 53, I/O interfaces 54 and 55, an operating portion 56 and a motor driver 57. The CPU 51 outputs control data to the motor driver 57, etc. through the I/O interface 55 on the basis of operational data inputted, through the I/O interface 54, from the operating portion 56. The operating portion 56 is provided on the upper face of the upper unit 2. A program for controlling the motor driver 57, etc. is written in the ROM 52 connected to the CPU 51 such that the CPU 51 performs arithmetic operation of the control data according to the program stored in the ROM 52 on the basis of the operational data inputted to the CPU 51 from the operating portion 56. A portion of the RAM 53 is allocated to a working area for performing the arithmetic operation.

The control portion of the input device 15 includes a central processing unit (CPU) 61, a read-only memory (ROM) 62, a random access memory (RAM) 63 and an I/O interface 64. Operational data of the input keys such as the ten keys 15b and the setting keys 15d are inputted, through the I/O interface 64, to the CPU 61. The CPU 61 not only stores the inputted operational data in the RAM 63 but displays the inputted operational data in the indicator 15c. The CPU 51 of the apparatus housing 21 and the CPU 61 of the input device 15 can be connected to each other by the jack 1b and the plug 15a. In a state where the jack 1b and the plug 15a are coupled with each other, the CPU 61 inputs the operational data stored in the RAM 63 to the CPU 51 through the I/O interfaces 64 and 55. The CPU 51 actuates the motor driver 57, etc. on the basis of the inputted operational data.

Figure 6A:
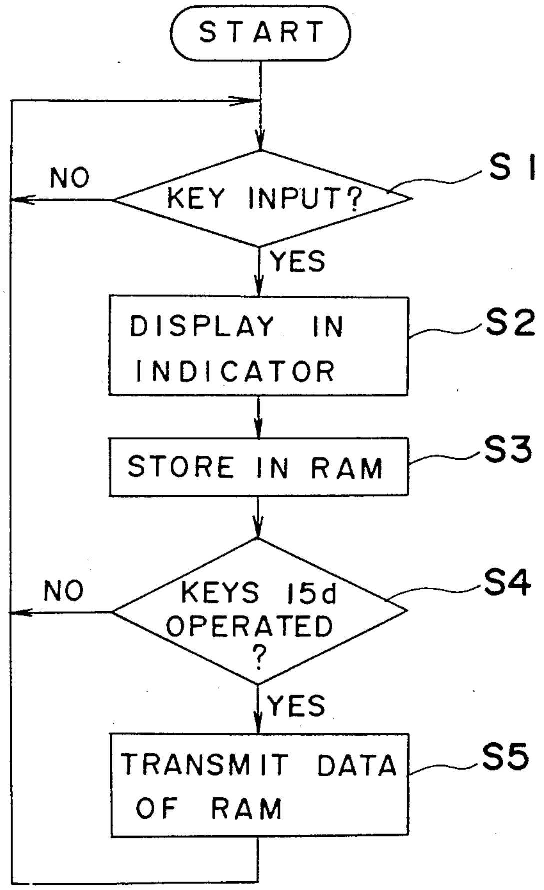
FIGS. 6*a* and 6*b* are, respectively, flow charts showing processing sequences of the control portion of the input device and the control portion of the apparatus housing in the copying apparatus of FIG. 4.
Figure 6B:
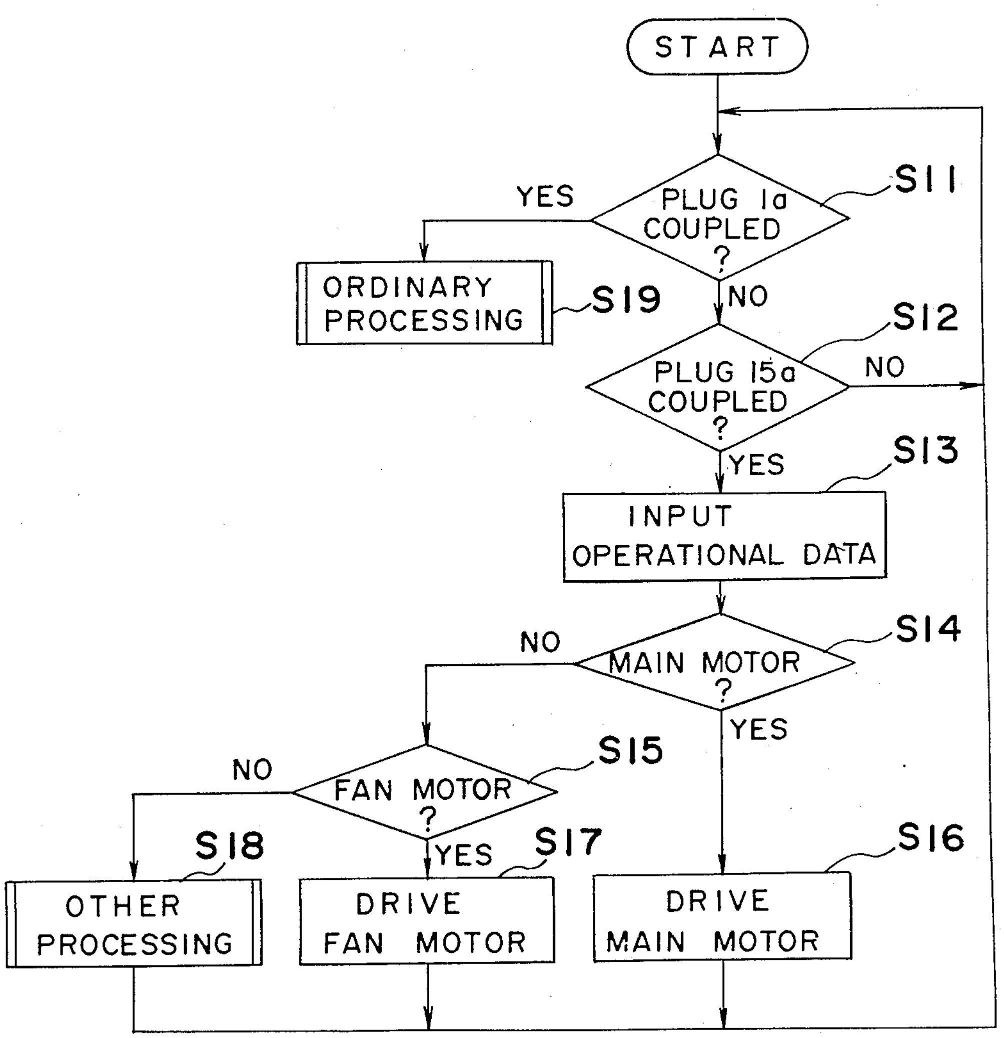

FIGS. 6a and 6b show processing sequences of the control portions of the input device 15 and the apparatus housing 21, respectively. When the plug 15a of the input device 15 has been coupled with the jack 1b, electric power is supplied to the input device 15. Then, when the input keys such as the ten keys 15b and the setting keys 15d have been tapped at step S1, the tapped input keys are displayed in the indicator 15c at step S2 and the contents of input of the tapped input keys are stored in the RAM 63 at step S3. Subsequently, if it is found at step S4 that the setting keys 15d have been tapped, the contents of input of the tapped input keys stored in the RAM 63 are transmitted to the CPU 51 of the apparatus housing 21.

When the power source of the apparatus housing 21 has been turned on, a decision is made at step S11 as to whether or not the plug 1a is coupled with the jack 1b. In the case of "YES" at step S11, an ordinary processing is performed on the basis of the operational data from the operating portion 56 at step S19. On the contrary, in the case of "NO" at step S11, a decision is made at step S12 as to whether or not the plug 15*a* is coupled with the jack 1*b*. In the case of "YES" at step S12, the operational data are transmitted from the input device 15 at step S13. Subsequently, a decision is made at step S14 as to whether or not the transmitted operational data are concerned with the main motor M1. In the case of "NO" at step S14, a decision is made at step S15 as to whether or not the transmitted operational data are concerned with the fan motor M2. In the case of "YES" at step S14, the main motor M1 is driven at step S16. Meanwhile, in the case of "YES" at step S15, the fan motor M2 is driven at step S17. In the case of "NO" at step S15, other processing is performed at step S18.

As is clear from the foregoing description, in the second embodiment of the present invention, in the case where the operational data cannot be inputted to the control portion of the apparatus housing 21 from the operating portion 56 due to the fact that the upper unit 2 is opened relative to or separated from the central unit 4, the operational data can be inputted to the control portion of the apparatus housing 21 from the input device 15 through the plug 15*a* and the jack 1*b*. Thus, the main motor M1 or the fan motor M2 provided in the central unit 4 is driven by the control portion of the apparatus housing 21. Meanwhile, only the main motor M1 and the fan motor M2 are described in the second embodiment of the present invention. However, in the second embodiment of the present invention, it can also be so arranged that the operational data are inputted from the input device 15 to solenoids, etc. constituting the paper feeding portion 33 or the paper transport passage 39.

In accordance with the second embodiment of the present invention, by coupling the connector of the input device with the connector provided in the unit, the control data for the driving device of the unit can be inputted from the input device to the control portion of the unit. Therefore, since the driving device of the unit can be driven in a state where the unit is separated from other units, it becomes possible to easily detect malfunctions or defective portions at the time of adjustment of the copying apparatus after its assembly or at the time of maintenance of the copying apparatus.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a multiple-unit type copying apparatus having an apparatus housing divided into a plurality of units, the improvement comprising:

- said units including a first unit in which an optical system and a driving means for driving said optical system are incorporated;
- said first unit being openably provided so as to be opened about its one end portion relative to the remaining units;
- a connector for coupling said driving means with a power source circuit, which is provided at a portion of said first unit other than said one end portion;
- a coupling detecting means for detecting a coupling state of said connector; and
- a power supply cut-off means for cutting off power supply to the remaining units when it has been found by said coupling detecting means that said connector is in an uncoupled state.

2. A multiple-unit type copying apparatus as claimed in claim 1, wherein said coupling detecting means includes a transistor.

3. A multiple-unit type copying apparatus as claimed in claim 1, wherein said power supply cut-off means includes a relay and a switch.

4. A multiple-unit type copying apparatus as claimed in claim 2, wherein said power supply cut-off means includes a relay and a switch.

5. In a multiple-unit type copying apparatus having an apparatus housing divided into a plurality of units, the improvement comprising:

- said units including at least one unit which is provided with a driving device, a control portion for outputting drive data to said driving device and a power source device for supplying electric power to said driving device;
- a connector which is secured to a coupling portion of each of said units; and
- an input device which has a mating connector engageable with said connector secured to said unit so as to input control data to said control portion through said mating connector.

6. A multiple-unit type copying apparatus as claimed in claim 5, wherein said driving device includes a main motor and a fan motor.

* * * * *